United States Patent [19]

Smearing

[11] 4,360,446

[45] Nov. 23, 1982

[54] STORAGE STABLE REACTIVE PEROXIDE PASTE COMPOSITION

[75] Inventor: Robert W. Smearing, Pittsfield, Mass.

[73] Assignee: General Electric Company, Schenectady, N.Y.

[21] Appl. No.: 135,283

[22] Filed: Mar. 31, 1980

[51] Int. Cl.$^3$ .................... C11D 3/395; C07C 179/06
[52] U.S. Cl. .................................... 252/428; 252/407
[58] Field of Search ........................ 252/186, 407, 428

[56] References Cited

U.S. PATENT DOCUMENTS

| | | | |
|---|---|---|---|
| Re. 28,818 | 5/1976 | Eymans et al. | 252/186 |
| T998,005 | 9/1980 | Orwol et al. | 252/186 |
| 3,324,040 | 6/1967 | Spoor | 252/186 |
| 3,507,800 | 4/1970 | Leveskis | 252/186 |
| 3,731,791 | 5/1973 | Fourcade et al. | 252/186 |
| 4,178,263 | 12/1979 | Priddy | 252/186 |

Primary Examiner—Deborah L. Kyle
Attorney, Agent, or Firm—Hedman, Casella, Gibson & Costigan

[57] ABSTRACT

A stable and non-separating catalyst paste, reactive into a polyester system, said paste comprising a diacyl peroxide; a plasticizing amount of a vinyl-reactive di(hydroxyloweralkoxyalkyl) fumarate plasticizer; a finely divided mineral filler, e.g., calcium carbonate, in an amount sufficient to prevent the composition from physically separating into its components; the remainder, if any, being water.

8 Claims, No Drawings

STORAGE STABLE REACTIVE PEROXIDE PASTE COMPOSITION

This invention relates to storage stable, reactive peroxide pastes. More particularly, it relates to pastes comprising a peroxide, a di(hydroxyalkoxyalkyl) fumarate plasticizer, a finely divided calcium carbonate in an amount sufficient to prevent separation of the paste during storage and, optionally, water.

BACKGROUND OF THE INVENTION

Benzoyl peroxide and its derivatives form a family of useful initiators used widely in the polyester and plastics industry. For example, such peroxides catalyze the polymerization of styrene, vinyl chloride, and the like, and the cross-linking of unsaturated polyester compositions. Dry peroxides of this family are shock sensitive and flammable. It is possible to add inert plasticizers to reduce the danger in handling, and, commercial pastes containing 50 or 55% of the peroxide in tricresyl phosphate or in phthalate esters are now widely available; these can contain up to 15% by water, too, to substantially further reduce safety hazards.

In U.S. Pat. No. Re. 28,818, it is proposed to further stabilize such compositions against separation in storage by adding a small, effective amount of an expensive hydrophobic alkyl-group-containing silicone. In U.S. Pat. No. 3,731,791, creamy catalyst pastes are described comprising benzoyl peroxide, dimethyl phthalate, ground calcite and di-2-ethylhexyl phthalate. A stable paste with a unique whipped cream-like consistency is disclosed in applicant's earlier filed copending U.S. patent application Ser. No. 7,581, filed Jan. 29, 1979 now U.S. Pat. No. 4,255,277. This comprises a paste of granular peroxide, water, a non-reactive plasticizer, such as dibutyl phthalate and some mineral filler. A stable, reactive paste is disclosed in commonly assigned Charles Donald Dudgeon and John J. Keane's copending and concurrently filed U.S. patent application Ser. No. 135,787, filed of even date herewith. Such catalysts comprise a diacyl peroxide, a vinyl reactive fumarate, e.g., diethyl fumarate or dibutyl fumarate, some mineral filler and, optionally, water. The reactive fumarate provides for curing into polyester resins and elevates their heat distortion temperature in a most desirable way. The foregoing patents and applications are all incorporated herein by reference.

While the pastes of the prior art can now be produced in a stable, non-separating, pumpable, mixable form with the ability to produce cured resins without substantial unreacted plasticizer content, long term aging can stand improvement, especially under accelerated, above room temperature conditions.

A technique has now been found to overcome such problems, and this is by providing a peroxide paste with a vinyl reactive monomeric fumarate diester of a very specific type, namely, a di(hydroxyloweralkoxyloweralkyl) fumarate. Such a composition is more stable on accelerated aging than any heretofore known, and provides high heat deflection temperatures in the ultimate product, e.g., a mine bolt resin or a rapid-cure accelerated polyester.

DESCRIPTION OF THE INVENTION

According to the present invention, in its broadest aspects, there are provided storage stable, reactive paste compositions comprising:

(a) dibenzoyl peroxide or a dibenzoyl peroxide having one or more substituents selected from halogen, (lower)alkyl or (lower)alkoxy;
(b) a vinyl-reactive fumarate plasticizer therefor comprising a di(hydroxyloweralkoxyloweralkyl) fumarate;
(c) finely divided particulate mineral filler, e.g., calcium carbonate, silica or talc, in an amount sufficient to prevent the composition from physically separating into its components; and
(d) the remainder, if any, being water.

With respect to component (a) the compounds are readily made and many are available commercially. The term "(lower)alkyl" and "(lower)alkoxy" refers to groups having from 1 to 6 carbon atoms. "Halogen" includes chlorine and bromine. Illustrative peroxides are benzoyl peroxide, di(2,4-dichlorobenzoyl) peroxide, di(p-methoxybenzoyl) peroxide, di(p-chlorobenzoyl) peroxide and the like. Preferably, the peroxide component is benzoyl peroxide.

Component (b), the fumarate, will be substituted with two hydroxy(lower)alkoxy(lower)alkyl groups. It will be a compound of the general formula:

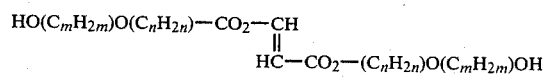

wherein m and n, independently, are whole integers of from 2 to 6 carbon atoms and the alkyl and alkoxyl groups of from 3 to 6 carbon atoms, respectively, can be straight chain or branched. Illustrative fumarates are di($\beta$-hydroxyethoxyethyl) fumarate, di($\beta$-hydroxypropoxyisopropyl) fumarate and the like. These can be made in known ways, e.g., by ester interchange between diethylene glycol or dipropylene glycol and diethyl fumarate or di-n-butyl fumarate. A more preferred way is to react two moles of the corresponding glycol, e.g., diethylene glycol, with one mole of maleic anhydride, e.g., at elevated temperature in a typical azeotropic process. At elevated temperatures, the maleate portion isomerizes to the fumarate.

Component (c) is required to be a finely divided form of mineral filler, e.g., calcium carbonate. The mineral filler can comprise, e.g., a ground form of limestone or it can be precipitated form. Both are crystalline, the precipitated form being somewhat less dense, and having a much smaller particle size. The particle size of mineral filler should be below about 30 microns and, especially preferably, below about 1.50 microns (ASTMD 1366-55T). Suitable commercial forms of ground calcium carbonate are available from Pfizer, Inc. under the trademark VICRON, and a suitable form of precipitated calcium carbonate is sold by Pfizer under the trademark ALBAGLOS.

Component (d), water, is optional. In general, readily available commercial peroxides are prepared by crystallization from water and thus contain from trace amounts up to about 15% by weight of water. In any case, more water can be added when making the present composition.

It is to be understood that the compositions of this invention can also include a minor content of a conventional plasticizer. This can come about if, instead of a granular peroxide as component (a), the peroxide containing an ester of an inorganic or organic polybasic acid, e.g., a phosphate, a phthalate, an isophthalate, a trimellitate, a citrate, a glutarate, or an adipate ester, etc. Typical of such are triphenyl phosphate, tricresyl phosphate, diethyl phthalate, diethyl phthalate, dibutyl phthalate, diisobutyl phthalate, dioctyl phthalate, butyl benzyl phthalate, and the like.

The compositions according to this invention are obtained by mixing in a suitable mixer the peroxide with the fumarate plasticizer, the finely divided mineral filler and, optionally, water, for a time sufficient to obtain a homogeneous mixture.

The ratio of ingredients can be varied over a rather broad range, easily determined by trial and error, and the final product preferably will have a "whipped cream-like" consistency.

For illustrative purposes, from 10 to 60 parts of peroxide (a) can be mixed with from 15 to 40 parts of fumarate plasticizer (b) and to these can be added up to 40 parts of mineral filler, any balance being water. Preferably, per 100 parts, (a) will comprise from 15 to 25 parts, (b) from 15 to 40 parts, (c) from 30 to 40 parts and (d), if any, the balance. Especially preferred ratios will be exemplified in detail hereinafter.

As has been mentioned, the catalyst pastes have many uses. The present pastes are very useful as components in mine bolt resin capsules, which are two compartmented packages, one of which contains the catalyst and the other a cross-linkable polyester resin composition. The paste can be filled readily as part of the packaging process because the fumarate makes it easy to pump, and the filled packages are superior to previous systems because the creamy catalyst mixes readily into the resin when the capsule is deliberately broken during application. Moreover, the reactive fumarate ester helps provide a stronger bond between the bolt and the wall of the drilled hole. Finally, the special fumarate provides better shelf life on accelerated aging, which is of substantial benefit to mining supply and warehouse operations.

DESCRIPTION OF THE PREFERRED EMBODIMENT

The following example illustrates the present invention. It is not to be construed to limit the claims any manner whatsoever.

EXAMPLE

Azeotropic distillation conditions are used to prepare the reaction product of two moles of diethylene glycol and one mole of maleic anhydride. The product is di($\beta$-hydroxyethoxyethyl) fumarate.

A peroxide paste is prepared by intimately blending the following in a Waring Blender:

| Components | Parts By Weight |
| --- | --- |
| Benzoyl peroxide paste 50% in butyl benzyl phthalate (plasticizer) | 40.0 |
| Water | 4.17 |
| Diester of diethylene glycol and fumaric acid | 20.83 |
| Calcium carbonate (Pfizer VICRON 41-8 ground limestone) | 35.0 |

The paste is of excellent consistency, stable for more than 20 weeks, at a temperature of 25° C., and successfully catalyzes the cure of a mine bolt polyester compound with no observable content of unreacted ester material.

It is obvious that many variations are possible in light of the above-detailed description. For example, instead of calcium carbonate, silica and/or talc can be used. All such variations are within the full intended scope of the appended claims.

I claim:

1. A storage stable, reactive peroxide paste composition comprising:
   (a) dibenzoyl peroxide or a dibenzoyl peroxide having one or more substituents selected from halogen, lower alkyl or lower alkoxy;
   (b) a fumarate plasticizer therefor comprising a di-(hydroxylower-alkoxylower alkyl) fumarate; and
   (c) finely divided particulate mineral filler in an amount sufficient to prevent the composition from physically separating into its components.

2. A composition as defined in claim 1 wherein component (a) is dibenzoyl peroxide.

3. A composition as defined in claim 1 wherein plasticizer component (b) comprises the reaction product of the azeotropic distillation of one mole of maleic anhydride and two moles of diethylene glycol.

4. A composition as defined in claim 1 wherein plasticizer component (b) comprises di($\beta$-hydroxyethoxyethyl) fumarate.

5. A storage stable reactive peroxide paste composition comprising per 100 parts by weight:
   (a) from 15 to 25 parts by weight of benzoyl peroxide;
   (b) from 15 to 40 parts by weight of di($\beta$-hydroxyethoxyethyl) fumarate; and
   (c) from 30 to 40 parts by weight of finely divided calcium carbonate.

6. A composition as defined in claim 5 wherein component (c) is calcium carbonate having a maximum particle size of below about 1.5 microns and a specific gravity of less than about 2.68 g./cc.

7. A composition as defined in claim 1 or claim 5 which further comprises a component (d) water.

8. A storage stable, reactive peroxide paste composition comprising:
   (a) from 10 to 60 parts by weight of dibenzoyl peroxide or a dibenzoyl peroxide having one or more substituents selected from halogen, lower alkyl or lower alkoxy;
   (b) from 15 to 40 parts by weight per 100 parts by weight of (a), (b) and (c) combined of a fumarate plasticizer therefor comprising a di-(hydroxylower-alkoxyloweralkyl) fumarate; and
   (c) finely divided particulate mineral filler in an amount sufficient to prevent the composition from physically separating into its components.

* * * * *